US009520593B2

(12) United States Patent
Sun et al.

(10) Patent No.: US 9,520,593 B2
(45) Date of Patent: Dec. 13, 2016

(54) METHOD OF PREPARING CATHODE ACTIVE MATERIAL PRECURSOR FOR LITHIUM RECHARGEABLE BATTERY, CATHODE ACTIVE MATERIAL PRECURSOR FOR LITHIUM RECHARGEABLE BATTERY PREPARED THEREBY, AND CATHODE ACTIVE MATERIAL FORMED USING THE CATHODE ACTIVE MATERIAL PRECURSOR (71) Applicant: IUCF-HYU (INDUSTRY-UNIVERSITY COOPERATION FOUNDATION HANYANG UNIVERSITY), Seoul (KR)

(72) Inventors: Yang-Kook Sun, Seoul (KR); Hyung Joo Noh, Bucheon-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 45 days.

(21) Appl. No.: 14/389,502

(22) PCT Filed: Mar. 29, 2013

(86) PCT No.: PCT/KR2013/002616
§ 371 (c)(1),
(2) Date: Sep. 30, 2014

(87) PCT Pub. No.: WO2013/147537
PCT Pub. Date: Oct. 3, 2013

(65) Prior Publication Data
US 2015/0053890 A1    Feb. 26, 2015

(30) Foreign Application Priority Data
Mar. 31, 2012 (KR) .......... 10-2012-0033647
Mar. 29, 2013 (KR) .......... 10-2013-0034025

(51) Int. Cl.
*H01M 4/02* (2006.01)
*H01M 4/485* (2010.01)
*H01M 4/52* (2010.01)
*H01M 4/36* (2006.01)
*H01M 4/1391* (2010.01)
*H01M 4/525* (2010.01)
*C01G 53/00* (2006.01)
*H01M 4/505* (2010.01)

(52) U.S. Cl.
CPC ............ *H01M 4/364* (2013.01); *C01G 53/006* (2013.01); *C01G 53/44* (2013.01); *H01M 4/02* (2013.01); *H01M 4/1391* (2013.01); *H01M 4/485* (2013.01); *H01M 4/52* (2013.01); *H01M 4/525* (2013.01); *C01P 2002/88* (2013.01); *C01P 2004/84* (2013.01); *C01P 2006/40* (2013.01); *H01M 4/505* (2013.01); *Y02E 60/122* (2013.01); *Y02P 70/54* (2015.11)

(58) Field of Classification Search
CPC ........ H01M 4/02; H01M 4/131; H01M 4/139; H01M 4/485; H01M 4/50; H01M 4/52
See application file for complete search history.

(56) References Cited

U.S. PATENT DOCUMENTS

2009/0068561 A1* 3/2009 Sun ........................ H01M 4/131
                                                       429/223
2010/0209779 A1   8/2010 Wendman
2011/0159365 A1   6/2011 Loveness

FOREIGN PATENT DOCUMENTS

| KR | 10-20070097923 A | 10/2007 |
| KR | 100815583 B1 | 3/2008 |
| KR | 10-20110083383 A | 7/2011 |

OTHER PUBLICATIONS

International Search Report dated Aug. 12, 2013.

* cited by examiner

*Primary Examiner* — Khanh Tuan Nguyen
*Assistant Examiner* — Haidung Nguyen
(74) *Attorney, Agent, or Firm* — Lucas & Mercanti, LLP (57) ABSTRACT The present invention relates to a method of preparing a cathode active material precursor for a lithium rechargeable battery, the cathode active material precursor for the lithium rechargeable battery prepared thereby, and a cathode active material formed using the cathode active material precursor. According to the present invention, the method of preparing a cathode active material precursor for a lithium secondary battery controls the concentration of a concentration gradient part and a shell part in a precursor to obtain a desired concentration of a transition metal in the shell part. As a result, a metal composition is distributed in a continuous concentration gradient from the interface between the core part and the shell part to the surface of the cathode active material, thereby a cathode active material with excellent thermal stability.

13 Claims, 6 Drawing Sheets

METHOD OF PREPARING CATHODE ACTIVE MATERIAL PRECURSOR FOR LITHIUM RECHARGEABLE BATTERY, CATHODE ACTIVE MATERIAL PRECURSOR FOR LITHIUM RECHARGEABLE BATTERY PREPARED THEREBY, AND CATHODE ACTIVE MATERIAL FORMED USING THE CATHODE ACTIVE MATERIAL PRECURSOR

CROSS-REFERENCE TO RELATED APPLICATIONS

This application is a 371 of PCT/KR2013/002616, filed Mar. 29, 2013, which claims the benefit of Korean Patent Application No. 10-2012-0033647, filed Mar. 31, 2012 and of Korean Patent Application No. 10-2013-0034025, filed Mar. 29, 2013, the contents of each of which are incorporated herein by reference.

TECHNICAL FIELD

The present invention relates to a method of preparing a cathode active material precursor for a lithium rechargeable battery, the cathode active material precursor for the lithium rechargeable battery prepared thereby, and a cathode active material formed using the cathode active material precursor.

BACKGROUND ART

As sizes and weights of portable electronic devices have been reduced, high-performance and high-capacity batteries for power sources thereof have been increasingly demanded.

Lithium ion rechargeable batteries have been widely used as power sources of portable devices since 1991 because of their small, light, and high-capacity characteristics. Recently, electronic, information and communication devices (e.g., camcorders, cell phones, and laptop computers) have been markedly developed with the rapid development of electronic, communication, and computer industries, so the lithium ion rechargeable batteries have been increasingly demanded to be used as power sources of these devices.

In particular, a power source for a hybrid electric vehicle having both an internal combustion engine and the lithium ion rechargeable battery is being actively researched in the United States, Japan, Europe, and so on. The lithium ion rechargeable battery is considered as a large battery for an electric vehicle because of its energy density, but it is in an early stage of the development and has a stability problem. A nickel metal hydride battery has been used in the electric vehicle because of its stability. In other words, the lithium ion rechargeable battery has high-cost and stability problems.

In particular, commercially available cathode active materials (e.g., $LiCoO_2$ and $LiNiO_2$) have an unstable crystal structure due to delithiation upon charging the battery, so thermal characteristics of the cathode active materials are very poor. In other words, if the overcharged battery is heated at a temperature of 200° C. to 270° C., the structure of the battery is rapidly changed to cause an oxygen emitting reaction in lattices of the changed structure (J. R. Dahn et al., Solid State Ionics, 69, 265(1994)).

To solve this problem, it has been attempted to substitute a portion of nickel with a transition metal element to increase an exothermic start temperature or broaden an exothermic peak preventing a rapid exothermic reaction (T. Ohzuku et al., J. Electrochem. Soc., 142, 4033 (1995), Japanese Patent laid-open Publication No. 1997-237631). However, the results have not yet been satisfied.

In addition, LiNi1-xCoxO2 (x=0.1-0.3) materials in which a portion of nickel is substituted with thermally stable cobalt shows good charge-discharge and lifetime characteristics, but it cannot provide thermal stability.

Furthermore, a Li—Ni—Mn-based composite oxide and a Li—Ni—Mn—Co-based composite oxide and methods of preparing the same have been suggested. The Li—Ni—Mn-based composite oxide is prepared by substituting a portion of nickel (Ni) with thermally stable manganese (Mn), and the Li—Ni—Mn—Co-based composite oxide is prepared by substituting a portion of Ni with Mn and cobalt (Co). For example, Japanese Patent laid-open Publication No. 1996-171910 discloses a method of preparing a cathode active material of $LiNi_xMn_{1-x}O_2$ (0.7≤x≤0.95), and the method includes: mixing an aqueous solution of Mn and Ni with an alkaline solution to co-precipitate Mn and Ni; mixing the co-precipitated compound with lithium hydroxide; and firing the mixture of the co-precipitated compound and the lithium hydroxide. Japanese Patent laid-open Publication No. 2000-227858 discloses a cathode active material in which a compound of Mn and Ni compounds is uniformly distributed at an atomic level to provide a solid solution instead of the concept that the transition metal element is partially substituted into $LiNiO_2$ or $LiMnO_2$.

According to European Patent No. 0918041 or U.S. Pat. No. 6,040,090, $LiNi_{1-x}Co_xMn_yO_2$ (0<y≤0.3) has improved thermal stability compared to that of materials composed of only Ni and Co. However, $LiNi_{1-x}Co_xMn_yO_2$ (0<y≤0.3) may not be commercially developed due to its reactivity with an electrolytic solution of $Ni^{4+}$. In addition, European Patent No. 0872450 discloses $Li_aCo_bMn_cM_dNi_{1-(b+c+d)}O_2$ (M=B, Al, Si, Fe, Cr, Cu, Zn, W, Ti, or Ga) in which Ni is substituted with another metal as well as Co and Mn. However, the thermal stability of the Ni-based material is not yet solved.

To solve this problem, Korean Patent Laid-open Publication No. 2006-00355547 discloses a double-layered cathode active material including an internal part composed of a nickel-based internal active material and an external part composed of a transition-metal composite active material. The nickel-based internal active material has a high capacity characteristic, and the transition-metal composite active material has a high stability characteristic. Thus, the double-layered cathode active material has the high capacity characteristic, a high charging density, an improved lifetime characteristic, and excellent thermal stability.

In addition, Korean Patent No. 10-0744759 discloses a cathode active material in which a metal composition is distributed in a continuous concentration gradient from an interface between a core and an outer shell to a surface of the active material. The cathode active material disclosed in Korean Patent No. 10-0744759 has excellent thermal stability.

To prepare the cathode active material, a heat treatment may be performed after preparing a precursor. However, since a metal is diffused during the heat treatment, it is difficult to prepare the outer shell having the transition metal of a desired concentration.

DISCLOSURE OF THE INVENTION

Technical Problem

In a method of preparing a cathode active material in which a metal composition is distributed in a continuous concentration gradient from an interface between a core and an outer shell to a surface of the cathode active material to provide its excellent thermal stability, the present invention provides a method of preparing a precursor capable of forming the outer shell that has a transition metal of a desired concentration.

Technical Solution

According to an embodiment of the present invention, a method of preparing a cathode active material precursor for a lithium rechargeable battery includes: preparing a metallic salt aqueous solution for formation of a core part and a metallic salt aqueous solution for formation of a shell part that include nickel, cobalt, and manganese as metallic salts; providing a chelating agent, an alkaline aqueous solution, the metallic salt aqueous solution for the formation of the core part, and the metallic salt aqueous solution for the formation of the shell part into a reactor while changing a mixing ratio of the metallic salt aqueous solution for the formation of the core part and the metallic salt aqueous solution for the formation of the shell part, thereby forming a concentration gradient part of which concentrations of metallic salts are gradually changed; providing a chelating agent, an alkaline aqueous solution, the metallic salt aqueous solution for the formation of the core part, and the metallic salt aqueous solution for the formation of the shell part into the reactor while mixing the metallic salt aqueous solution for the formation of the core part and the metallic salt aqueous solution for the formation of the shell part at a fixed ratio, thereby forming a shell part having a fixed concentration; and drying and heating a formed precipitate to prepare an active material precursor.

When a concentration of a specific metallic salt of the concentration gradient part in a contact portion of the concentration gradient part and the shell part is denoted by "$M_C$" and a concentration of the specific metallic salt of the shell part in the contact portion of the concentration gradient part and the shell part is denoted by "$M_S$", the $M_C$ and the $M_S$ satisfy a relation formula $M_C \neq M_S$.

In some embodiments, a concentration of the specific metallic salt at a center of the concentration gradient part is denoted by "$M_{CO}$", and the $M_C$ and the $M_S$ satisfy a relation formula $M_C < M_S$ when the $M_{CO}$ and the $M_C$ satisfy a relation formula $M_{CO} < M_C$.

In some embodiments, a difference between the $M_S$ and the $M_C$ is in a range of 2 mol % to 40 mol %.

In some embodiments, a concentration of the specific metallic salt at a center of the concentration gradient part is denoted by "$M_{CO}$", and the $M_C$ and the $M_S$ satisfy a relation formula $M_C > M_S$ when the $M_{CO}$ and the $M_C$ satisfy a relation formula $M_{CO} > M_C$.

In some embodiments, a difference between the $M_S$ and the $M_C$ is in a range of 2 mol % to 30 mol %.

In some embodiments, a metal of the specific metallic salt satisfying the relation formula $M_{CO} < M_C$ is nickel, and a metal of the specific metallic salt satisfying the relation formula $M_{CO} > M_C$ is cobalt and manganese.

In some embodiments, the method further includes: providing a chelating agent, an alkaline aqueous solution, and the metallic salt aqueous solution for the formation of the core part to form a core part between preparing the metallic salt aqueous solution for the formation of the core part and the metallic salt aqueous solution for the formation of the shell part; and providing the chelating agent, the alkaline aqueous solution, the metallic salt aqueous solution for the formation of the core part, and the metallic salt aqueous solution for the formation of the shell part into the reactor while changing a mixing ratio of the metallic salt aqueous solution for the formation of the core part and the metallic salt aqueous solution for the formation of the shell part, thereby preparing the concentration gradient part. In other words, the lithium rechargeable battery precursor may include the shell part having only the concentration gradient part or may include the core part having a fixed concentration and the concentration gradient part.

In some embodiments, the metallic salt aqueous solution for the formation of the shell part may be used in plurality, and the plurality of the metallic salt aqueous solutions for the formation of the shell part may have concentrations different from each other. In addition, the concentration gradient part may include a metallic salt of which a concentration gradient is changed.

The present invention also provides a cathode active material precursor for a lithium rechargeable battery that is prepared by the method of preparing the cathode active material precursor for the lithium rechargeable battery.

The present invention also provides a method of preparing a cathode active material for a lithium rechargeable battery including: mixing the cathode active material precursor prepared by claim 1 with lithium salt; and firing the mixture of the cathode active material precursor and the lithium salt to obtain a lithium composite metal oxide. Moreover, the present invention also provides a cathode active material for a lithium rechargeable battery prepared by the same.

Advantageous Effects

According to the present invention, the method of preparing a cathode active material precursor for a lithium secondary battery controls the concentration of the concentration gradient part and the shell part in the precursor to obtain the desired concentration of the transition metal in the shell part. As a result, the metal composition is distributed in the continuous concentration gradient from the interface between the core part and the shell part to the surface of the cathode active material, thereby the cathode active material with excellent thermal stability.

BEST MODE FOR CARRYING OUT THE INVENTION

Hereinafter, exemplary embodiments of the present invention and a comparison example will be described in detail. However, it should be noted that the present invention is not limited to the following exemplary embodiments and may be implemented in various forms. Accordingly, the exemplary embodiments are provided only to disclose the present invention and let those skilled in the art know the category of the present invention.

Embodiment Example 1

To include nickel in a metal having a decreasing concentration in a concentration gradient part and to include cobalt and manganese in a metal having an increasing concentration in the concentration gradient part, a metal aqueous solution in which nickel sulfate and manganese sulfate were mixed at a molar ratio of 90:10 was prepared to be used as a metallic salt aqueous solution for formation of a core part and a 2.4 mole metal aqueous solution in which nickel sulfate, cobalt sulfate, and manganese sulfate were mixed at a molar ratio of 52:16:32 was prepared to be used as a metallic salt aqueous solution for formation of a shell part.

4 liters of distilled water were introduced into a co-precipitation reactor (a capacity of 4 L and a rotating motor output of 80 W or more) and a nitrogen gas was then supplied into the reactor at a rate of 0.5 liter/min to remove dissolved oxygen. The distilled water and the nitrogen gas were agitated in the reactor at 1000 rpm while maintaining a reactor temperature of 50° C.

The metallic salt aqueous solution for the formation of the core part was continuously provided into the reactor at a rate of 0.3 liter/hour and a 3.6 mole ammonia solution was also continuously provided into the reactor at a rate of 0.3 liter/hour, so the core part was formed. Next, the metallic salt aqueous solution for the formation of the shell part was mixed with the metallic salt aqueous solution for the formation of the core part over controlling a mixing ratio thereof and the mixture was provided into the reactor to form the concentration gradient part.

Next, the metallic salt aqueous solution for the formation of the shell part was supplied into the co-precipitation reactor at a fixed rate to form the shell part so that a nickel concentration of the shell part was higher than that of the concentration gradient part.

The compound was filtered and cleaned with water. Thereafter, the cleaned compound was dried at 110° C. for 15 hours by a warm-air dryer to obtain an active material precursor.

After LiOH used as lithium salt was mixed with the obtained active material precursor, the mixture of the active material precursor and LiOH was heated at a heating ratio of 2° C./min. Thereafter, the mixture of the active material precursor and LiOH was maintained at 450° C. for 5 hours by a preliminary firing process. Next, the mixture was fired at 820° C. for 10 hours to obtain a final active material particle.

Figure 1:
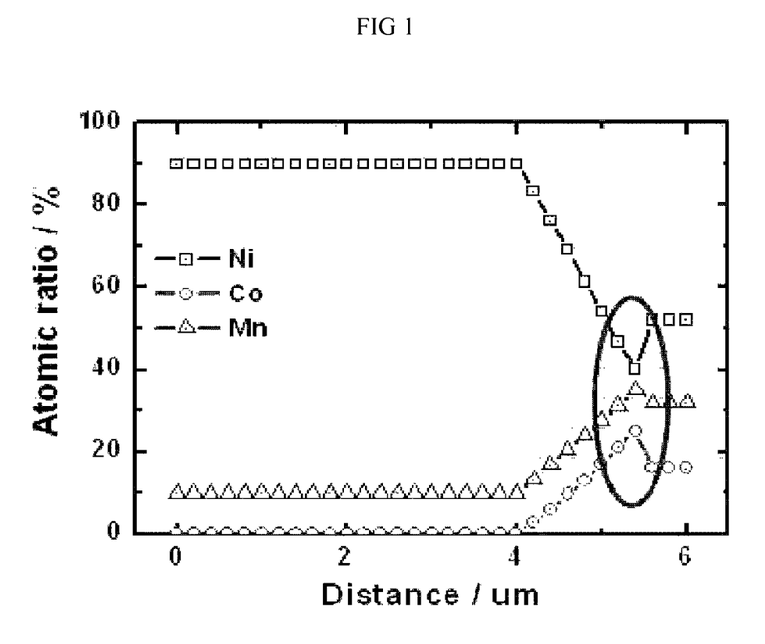
FIGS. 1 and 2 are graphs showing molar ratios according to a radius in a precursor and an active material prepared by an embodiment of the present invention.
Figure 2:
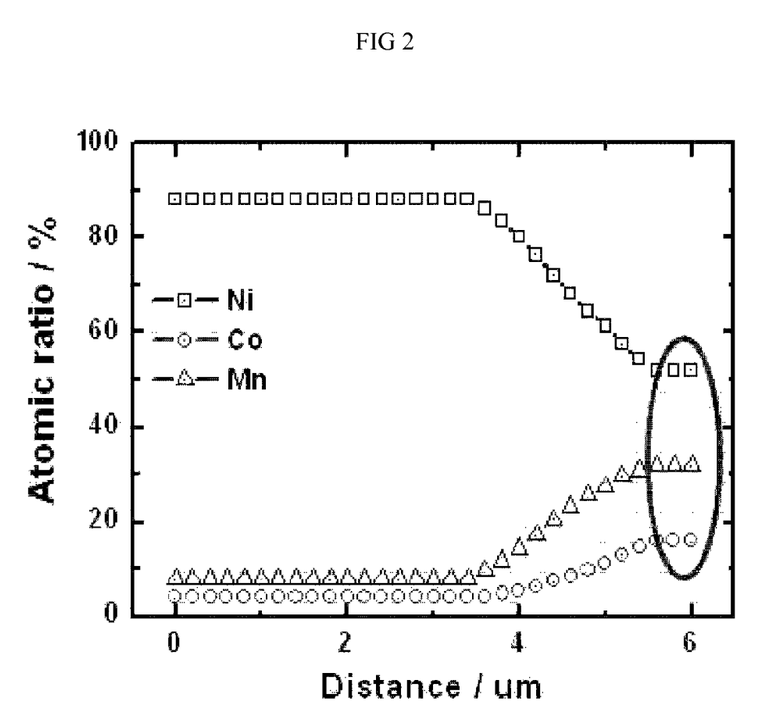

Molar ratios (e.g., atomic ratios) according to a radius of elements of the precursor and molar ratios according to a radius of elements of the final active material particle after the firing process were measured, and the measured results were shown in FIGS. 1 and 2, respectively. As shown in FIG. 1, a nickel concentration in the concentration gradient part was maintained to be lower than that in the shell part and a cobalt concentration and a manganese concentration in the concentration gradient part were higher than those of the shell part when the precursor was prepared. Thus, a concentration dilution effect caused by diffusion of the metal salts was not shown after the firing process, and the precursor having the desired concentrations was synthesized.

Comparison Example 1

A shell part was formed to have the same nickel, manganese, and cobalt concentrations as a concentration gradient part to obtain an active material precursor of the comparison example 1. After LiOH used as lithium salt was mixed with the obtained active material precursor, the mixture of the active material precursor and LiOH was heated at a heating ratio of 2° C./min. Thereafter, the mixture was maintained at 450° C. for 5 hours by a preliminary firing process, and the mixture was then fired at 820° C. for 10 hours to obtain a final active material particle.

Figure 3:
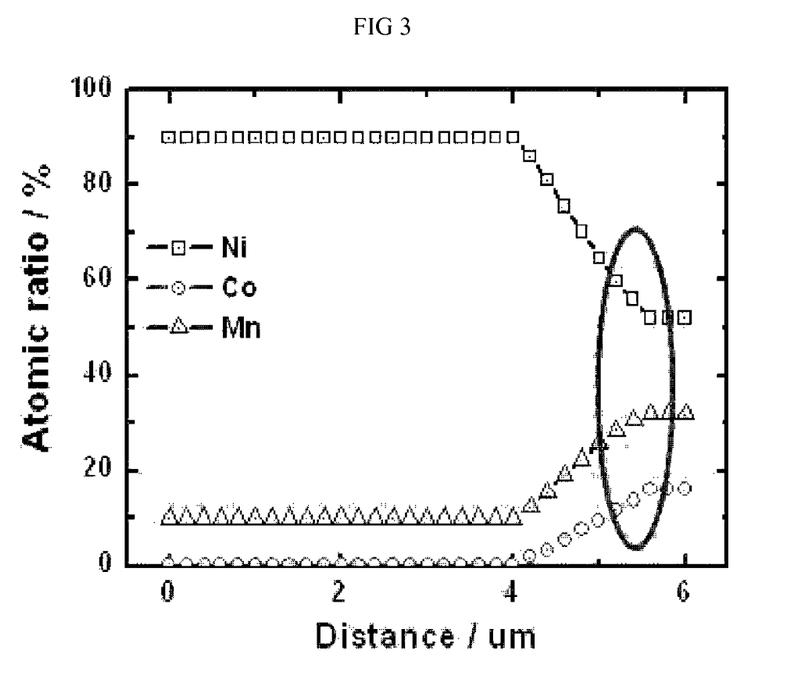
FIGS. 3 and 4 are graphs showing molar ratios according to a radius in a precursor and an active material prepared by an embodiment of the present invention.
Figure 4:
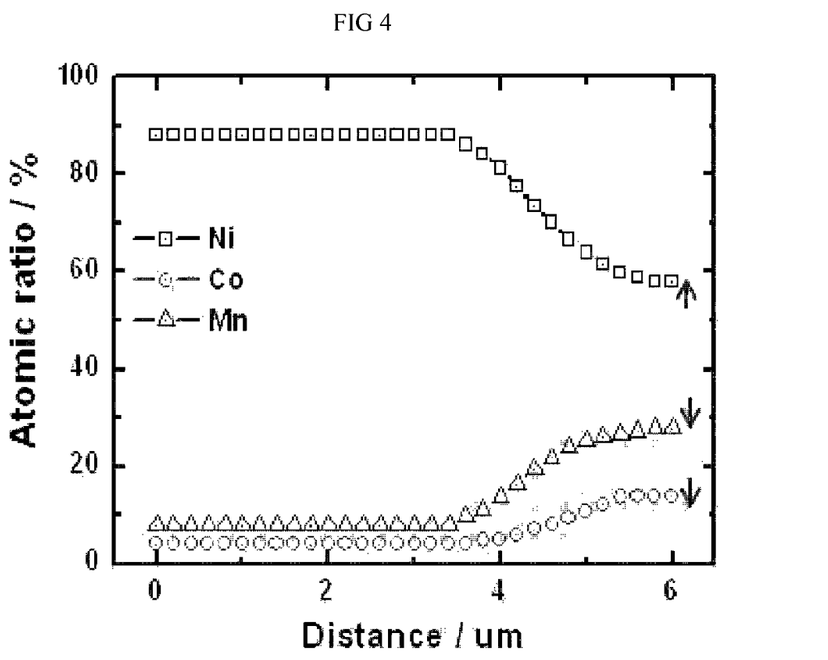

Molar ratios (e.g., atomic ratios) according to a radius of elements of the precursor and molar ratios according to a radius of elements of the final active material particle after the firing process were measured, and the measured results were shown in FIGS. 3 and 4, respectively. As shown in FIG. 3, concentrations of nickel, cobalt, and manganese in the concentration gradient part were equal to those in the shell part when the precursor was prepared. Thus, it was confirmed that the concentration dilution effect caused by diffusion of the metal salts was shown after the firing process.

Embodiment Example 2

To include nickel in a metal having a decreasing concentration in a concentration gradient part and to include cobalt and manganese in a metal having an increasing concentration in the concentration gradient part, a metal aqueous solution in which nickel sulfate, cobalt sulfate, and manganese sulfate were mixed at a molar ratio of 90:04:06 was prepared to be used as a metallic salt aqueous solution for formation of a core part and a 2.4 mole metal aqueous solution in which nickel sulfate, cobalt sulfate, and manganese sulfate were mixed at a molar ratio of 52:16:32 was prepared to be used as a metallic salt aqueous solution for formation of a shell part.

4 liters of distilled water were introduced into a co-precipitation reactor (a capacity of 4 L and a rotating motor output of 80 W) and a nitrogen gas was then supplied into the reactor at a rate of 0.5 liter/min to remove dissolved oxygen. The distilled water and the nitrogen gas were agitated in the reactor at 1000 rpm while maintaining a reactor temperature of 50° C.

The metallic salt aqueous solution for the formation of the core part was continuously provided into the reactor at a rate of 0.3 liter/hour and a 3.6 mole ammonia solution was also continuously provided into the reactor at a rate of 0.3 liter/hour while controlling a mixing ratio of the metallic salt aqueous solution for the formation of the shell part, thereby forming a first concentration gradient part. Subsequently, the metallic salt aqueous solution for the formation of the core part and the metallic salt aqueous solution for the formation of the shell part were mixed with each other over controlling their mixing ratio differently from that for the formation of the first concentration gradient part, and the mixture thereof was supplied to form a second concentration gradient part.

Next, the metallic salt aqueous solution for the formation of the shell part was supplied into the co-precipitation reactor at a fixed rate to form the shell part so that a nickel concentration of the shell part was higher than that of the second concentration gradient part.

The compound was filtered and cleaned with water. Thereafter, the cleaned compound was dried at 110° C. for 15 hours by a warm-air dryer to obtain an active material precursor.

After LiOH used as lithium salt was mixed with the obtained active material precursor, the mixture of the active material precursor and LiOH was heated at a heating ratio of 2° C./min. Subsequently, the mixture of the active material precursor and LiOH was maintained at 450° C. for 5 hours by a preliminary firing process. Next, the mixture was fired at 820° C. for 10 hours to obtain a final active material particle.

Embodiment Example 3

An active material precursor and an active material particle of the embodiment example 3 were prepared in accordance with the same procedure as in the embodiment example 1, except that a batch-type reactor was used.

Embodiment Example 4

An active material precursor and an active material particle of the embodiment example 4 were prepared in accordance with the same procedure as in the embodiment example 2, except that a batch-type reactor was used.

Experimental Example 1

Measurement of Charge/Discharge Characteristic and Lifetime Characteristic

A cathode was fabricated using each of the active materials prepared in the embodiment examples 1 to 4 and the comparison example 1, and it was applied to a cylindrical lithium rechargeable battery.

Figure 5:
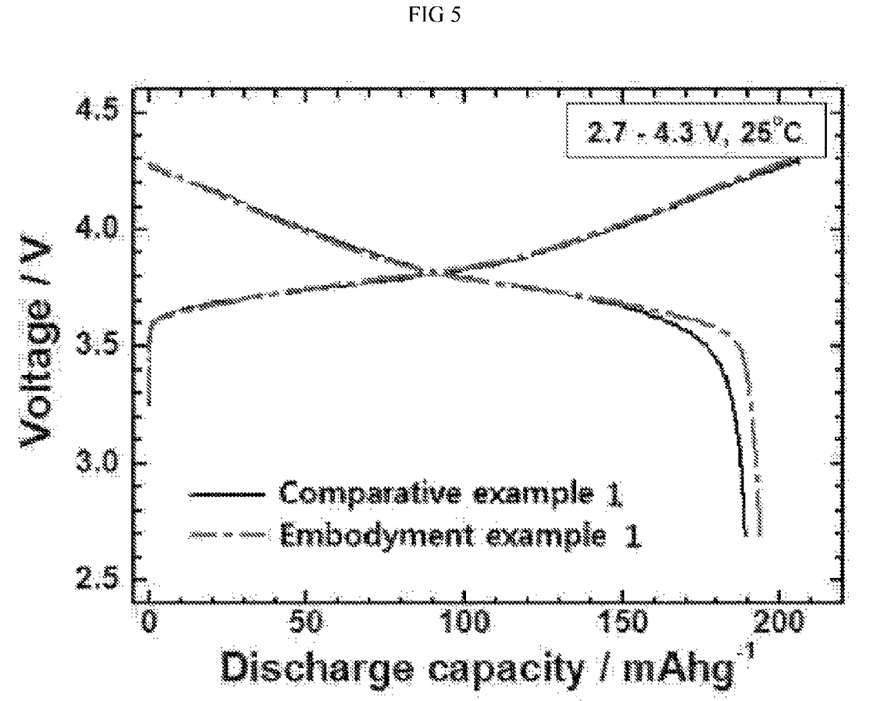
FIGS. 5 and 6 are graphs showing measurement results of a lifetime characteristic and a thermal stability characteristic of a lithium rechargeable battery including an active material prepared by an embodiment of the present invention.

Charge/discharge and lifetime characteristics of the fabricated batteries were measured, and the measured results were shown in FIG. 5 and the following table 1. The charge discharge of each sample (e.g., each fabricated battery) was measured 10 times in a condition of 0.2 C between 2.7 volts and 4.3 volts, and a mean value was obtained from the ten measured values of each sample.

TABLE 1

| | Capacity (mAh/g): 2.7 V~4.3 V, 0.1 C | Lifetime characteristic (%): 2.7 V~4.3 V, 0.5 C, 100 cycles | DSC (° C.): 4.3 V cut off |
|---|---|---|---|
| Embodiment example 1 | 193.8 | 93.6 | 268 |
| Embodiment example 2 | 192.6 | 94.5 | 273 |
| Embodiment example 3 | 193.5 | 93.7 | 268 |
| Embodiment example 4 | 192.4 | 94.9 | 274 |
| Comparison example 1 | 189.0 | 89.2 | 262 |

As shown in FIG. 5 and the table 1, it is confirmed that the charge/discharge and lifetime characteristics of the embodiment example 1 are greatly improved as compared with those of the comparison example 1.

Experimental Example 2

Evaluation of Thermal Stability Through DSC Measurement

In the state that a cathode including each of the active materials prepared in the embodiments 1 to 4 and the comparison example 1 was charged to 4.3V, a thermal stability of a battery including the cathode was measured using a differential scanning calorimeter (DSC) while it was heated at a heating rate of 10° C./min. The measured results were shown in FIG. 6 and the above table 1.

Figure 6:
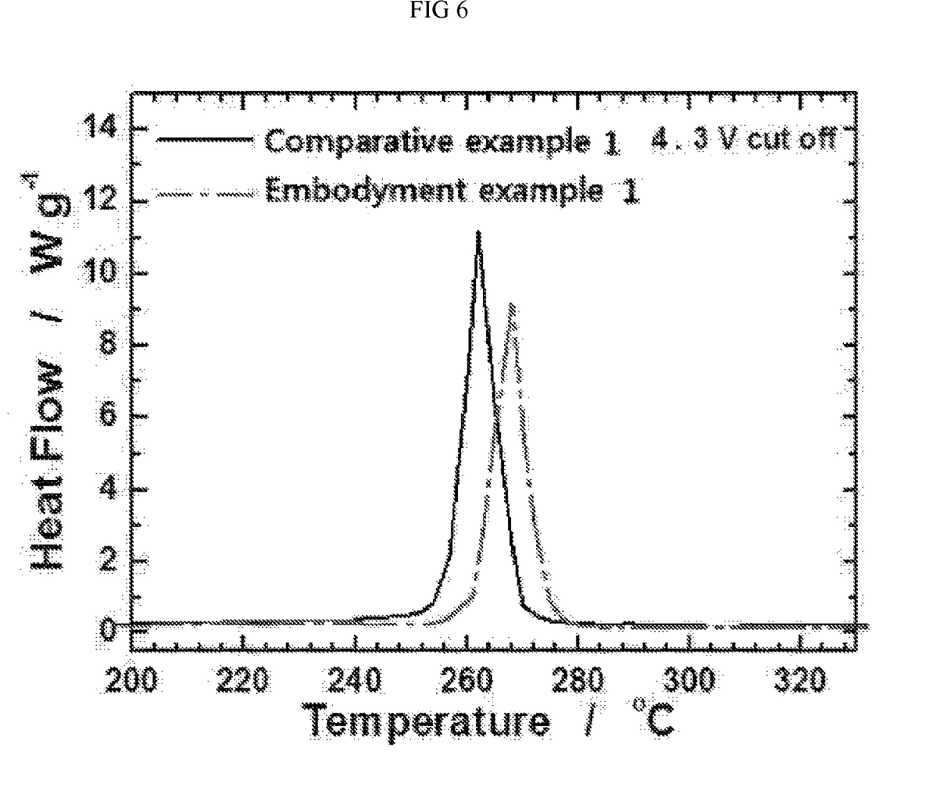

As shown in FIG. 6, a temperature of an exothermal peak of the battery including the active material of the embodiment example 1 is higher than that of the battery including the active material of the comparison example 1, so the thermal stability of the battery including the active material of the embodiment example 1 is greatly improved as compared with that of the battery including the active material of the comparison example 1.

INDUSTRIAL APPLICABILITY

According to the present invention, the method of preparing a cathode active material precursor for a lithium secondary battery controls the concentration of the concentration gradient part and the shell part in the precursor to obtain the desired concentration of the transition metal in the shell part. As a result, the metal composition is distributed in the continuous concentration gradient from the interface between the core part and the shell part to the surface of the cathode active material, thereby the cathode active material with excellent thermal stability.

What is claimed is:

1. A method of preparing a cathode active material precursor for a lithium rechargeable battery, the method comprising:
   preparing a metallic salt aqueous solution for formation of a core part and a metallic salt aqueous solution for formation of a shell part that include nickel, cobalt, and manganese as metallic salts;
   providing a first chelating agent, a first alkaline aqueous solution, the metallic salt aqueous solution for the formation of the core part, and the metallic salt aqueous solution for the formation of the shell part into a reactor while changing a mixing ratio of the metallic salt aqueous solution for the formation of the core part and the metallic salt aqueous solution for the formation of the shell part, thereby forming a concentration gradient part of which concentrations of metallic salts are gradually changed;
   providing a second chelating agent, a second alkaline aqueous solution, the metallic salt aqueous solution for the formation of the core part, and the metallic salt aqueous solution for the formation of the shell part into the reactor while mixing the metallic salt aqueous solution for the formation of the core part and the metallic salt aqueous solution for the formation of the shell part at a fixed ratio, thereby forming a shell part having a fixed concentration; and
   drying and heating a formed precipitate to prepare an active material precursor,
   wherein a concentration of a specific metallic salt of the concentration gradient part in a contact portion of the concentration gradient part and the shell part is denoted by "$M_C$", and a concentration of the specific metallic salt of the shell part in the contact portion of the concentration gradient part and the shell part is denoted by "$M_S$", and
   wherein the $M_C$ and the $M_S$ satisfy a relation formula $M_C \neq M_S$.

2. The method of claim 1, wherein a concentration of the specific metallic salt at a center of the concentration gradient part is denoted by "$M_{CO}$",
   wherein the $M_C$ and the $M_S$ satisfy a relation formula $M_C < M_S$ when the $M_{CO}$ and the $M_C$ satisfy a relation formula $M_{CO} < M_C$.

3. The method of claim 1, wherein a concentration of the specific metallic salt at a center of the concentration gradient part is denoted by "$M_{CO}$",
wherein the $M_C$ and the $M_S$ satisfy a relation formula $M_C > M_S$ when the $M_{CO}$ and the $M_C$ satisfy a relation formula $M_{CO} > M_C$.

4. The method of claim 2, wherein a difference between the $M_S$ and the $M_C$ is in a range of 2 mol % to 40 mol %.

5. The method of claim 3, wherein a difference between the $M_S$ and the $M_C$ is in a range of 2 mol % to 30 mol %.

6. The method of claim 2, wherein a metal of the specific metallic salt satisfying the relation formula $M_{CO} < M_C$ is nickel.

7. The method of claim 3, wherein a metal of the specific metallic salt satisfying the relation formula $M_{CO} > M_C$ is cobalt and manganese.

8. The method of claim 1, further comprising:
providing a third chelating agent, a third alkaline aqueous solution, and the metallic salt aqueous solution for the formation of the core part to form a core part between preparing the metallic salt aqueous solution for the formation of the core part and the metallic salt aqueous solution for the formation of the shell part; and providing the chelating agent, the alkaline aqueous solution, the metallic salt aqueous solution for the formation of the core part, and the metallic salt aqueous solution for the formation of the shell part into the reactor while changing a mixing ratio of the metallic salt aqueous solution for the formation of the core part and the metallic salt aqueous solution for the formation of the shell part, thereby preparing the concentration gradient part.

9. The method of claim 1, wherein the metallic salt aqueous solution for the formation of the shell part is used in plurality, and the plurality of the metallic salt aqueous solutions for the formation of the shell part have concentrations different from each other.

10. The method of claim 1, wherein the concentration gradient part includes a metallic salt of which a concentration gradient is changed.

11. A cathode active material precursor for a lithium rechargeable battery prepared by the method of claim 1.

12. A method of preparing a cathode active material for a lithium rechargeable battery, the method comprising:
mixing the cathode active material precursor prepared by claim 1 with lithium salt; and
firing the mixture of the cathode active material precursor and the lithium salt to obtain a lithium composite metal oxide.

13. A cathode active material for a lithium rechargeable battery prepared by claim 12.

* * * * *